US008804379B2

(12) United States Patent
Hsu et al.

(10) Patent No.: US 8,804,379 B2
(45) Date of Patent: Aug. 12, 2014

(54) FLYBACK CONVERTER SYSTEM AND FEEDBACK CONTROLLING APPARATUS AND METHOD FOR THE SAME

(75) Inventors: Wei-Chan Hsu, Taipei (TW);
Chong-Hock Yeam, Singapore (SG);
Siang-Yu Yang, Taipei (TW)

(73) Assignee: Neoenergy Microelectronics, Inc., Hsinchu County (TW)

( * ) Notice: Subject to any disclaimer, the term of this patent is extended or adjusted under 35 U.S.C. 154(b) by 313 days.

(21) Appl. No.: 13/012,261

(22) Filed: Jan. 24, 2011

(65) Prior Publication Data
US 2011/0255311 A1  Oct. 20, 2011

(30) Foreign Application Priority Data
Apr. 20, 2010  (TW) ................................ 99112405 A

(51) Int. Cl.
*H02M 3/335* (2006.01)
*H02M 1/00* (2006.01)
(52) U.S. Cl.
CPC .. *H02M 3/33507* (2013.01); *H02M 2001/0032* (2013.01); *Y02B 70/16* (2013.01)
USPC .................... 363/21.12; 363/21.16; 363/21.18

(58) Field of Classification Search
USPC .............. 363/17, 18, 20, 21.04, 21.12, 21.13, 363/21.14, 21.15, 21.16, 21.17, 21.18
See application file for complete search history.

(56) References Cited

U.S. PATENT DOCUMENTS

| 7,505,288 | B2* | 3/2009 | Duvnjak | 363/21.18 |
|---|---|---|---|---|
| 7,558,082 | B2* | 7/2009 | Jitaru | 363/21.06 |
| 7,782,638 | B2* | 8/2010 | Murata et al. | 363/21.16 |
| 8,125,799 | B2* | 2/2012 | Zhu et al. | 363/21.14 |
| 2005/0259455 | A1* | 11/2005 | Mori | 363/123 |
| 2008/0049472 | A1* | 2/2008 | Nishida et al. | 363/84 |
| 2010/0142232 | A1* | 6/2010 | Lin | 363/21.16 |
| 2010/0232187 | A1* | 9/2010 | Yang et al. | 363/21.15 |

* cited by examiner

*Primary Examiner* — Nguyen Tran
(74) *Attorney, Agent, or Firm* — Muncy, Geissler, Olds & Lowe, P.C.

(57) ABSTRACT

A flyback converter system and feedback controlling apparatus and method of operating the same are disclosed. The feedback controlling apparatus for the flyback converter system includes a primary feedback loop unit for generating a primary feedback signal, and a secondary feedback loop unit for generating a secondary feedback signal, a loop selector. In light-load conditions, the loop selector supplies the primary feedback signal to a PWM controller for feedback control, and the secondary feedback loop unit is disabled by a power monitor to save electrical energy.

16 Claims, 6 Drawing Sheets

FLYBACK CONVERTER SYSTEM AND FEEDBACK CONTROLLING APPARATUS AND METHOD FOR THE SAME

BACKGROUND OF THE INVENTION

1. Field of the Invention

The present invention relates to a flyback converter system, and more particularly, to a flyback converter system selectively using a primary feedback signal or a secondary side feedback signal.

2. Description of Prior Art

The power supply for electronic products generally needs electrical isolation between a power input end and a power output end. The electrical isolation can be realized by, for example, an isolation transformer. In a flyback converter, the output power is adjusted by controlling a series of pulses applied to the primary winding of the converter. More specifically, the turning-on time of the pulse is prolonged when the output power increases, while the turning-on time of the pulse is shortened when the output power decreases.

A conventional current mode flyback converter is shown in FIG. 1. In the conventional flyback system, output regulation is provided through the optocoupler (OPTO). In one popular implementation, the output voltage Vout is divided into a voltage Vdiv through a resistor network. Vdiv controls the shunt regulator TL431 which generates a current proportional to the difference of Vdiv and an internal regulated voltage in TL431, typically at 2.5V. The current generated will be converted into a feedback voltage (FB) through the optocoupler, OPTO. The PWM controller uses FB signal to control the on time of the switch Q such that proper voltage regulation is achieved.

In FIG. 1, Waux is the auxiliary winding which provides the power needed for the PWM controller. It can also be used to provide valuable information of the system such as input line voltage Vin and the voltage on the secondary winding Vy. For example:

Vx=Vy when Q is off
Vx=−Vin when Q is on

One continuous effort for flyback converter is to save as much power as possible in both normal load and light load or no-load conditions. The problem for light load or no-load condition is more prominent as any current consumed in the converter system itself constitutes a major part of the total power consumption. For a typical AC/DC adapter system, for example, vast majority of the time is spent in no load or light load condition. Hence any power saving in these condition will become significant overall power saving. One of the major components of current consumption in a flyback system is the output regulation circuit described above. A typical shunt regulator or other regulators consumes a few milleamperes. Tens of mille-watts of power are needed for the regulation circuit. While the regulation circuit in regular load condition plays very important role to assure the output voltage is within the desired operating range, it is an important task to reduce its current consumption in light load condition.

Therefore, it is desirable to provide a flyback converter system with accurate output regulation and fast dynamic response during normal-load (full-load) condition, and with less power consumption during light-load or no-load condition.

SUMMARY OF THE INVENTION

It is an object of the present invention to provide a flyback converter system selectively with both a primary feedback signal and a secondary side feedback signal.

It is another object of the present invention to provide a feedback control apparatus for a flyback converter system, where the feedback control apparatus selectively chooses a primary feedback signal or a secondary side feedback signal.

It is still another object of the present invention to provide a feedback control method for a flyback converter system, where the feedback control method selectively chooses a primary feedback signal or a secondary side feedback signal.

Accordingly, the present invention provides a flyback converter system, which comprises: a transformer unit comprising a primary winding, a secondary winding and an auxiliary winding, which are magnetically coupled to each other; a switch unit electrically connected to the primary winding; a pulse width modulation (PWM) control unit electrically connected to the switch unit; a primary feedback loop unit electrically connected to the auxiliary winding and generating a primary feedback voltage signal according to an induced voltage of the auxiliary winding; a secondary feedback loop unit electrically connected to the secondary winding and generating a secondary feedback voltage signal according to an output voltage of the secondary winding; a loop selector operatively connected to the primary feedback loop unit and the secondary feedback loop unit, and electrically connected to the PWM control unit, the loop selector configured to select one of the primary feedback voltage signal and the secondary feedback voltage signal as a feedback input signal input to the PWM control unit and to control the switch unit.

Accordingly, the present invention provides a feedback control apparatus for a flyback converter system. The feedback control apparatus comprises: a primary feedback loop unit electrically connected to an auxiliary winding of the transformer unit and generating a primary feedback voltage signal according to an induced voltage of the auxiliary winding; a secondary feedback loop unit electrically connected to a secondary winding of the transformer unit and generating a secondary feedback voltage signal according to an output voltage of the secondary winding; a loop selector operatively connected to the primary feedback loop unit and the secondary feedback loop unit, and electrically connected to the PWM control unit, the loop selector configured to select one of the primary feedback voltage signal and the secondary feedback voltage signal as a feedback input signal input to the PWM control unit and to control the switch unit.

Accordingly, the present invention provides a feedback control method for a flyback converter system. The method comprises following steps: (a) providing a primary feedback loop unit electrically connected to an auxiliary winding of the transformer unit and generating a primary feedback voltage signal according to an induced voltage of the auxiliary winding; (b) providing a secondary feedback loop unit electrically connected to a secondary winding of the transformer unit and generating a secondary feedback voltage signal according to an output voltage of the secondary winding; (c) judging whether the flyback converter system is operated in light-load condition; and (d) using the primary feedback voltage signal as feedback control signal when the flyback converter system is operated in light-load condition.

BRIEF DESCRIPTION OF THE DRAWINGS

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

Figure 1:
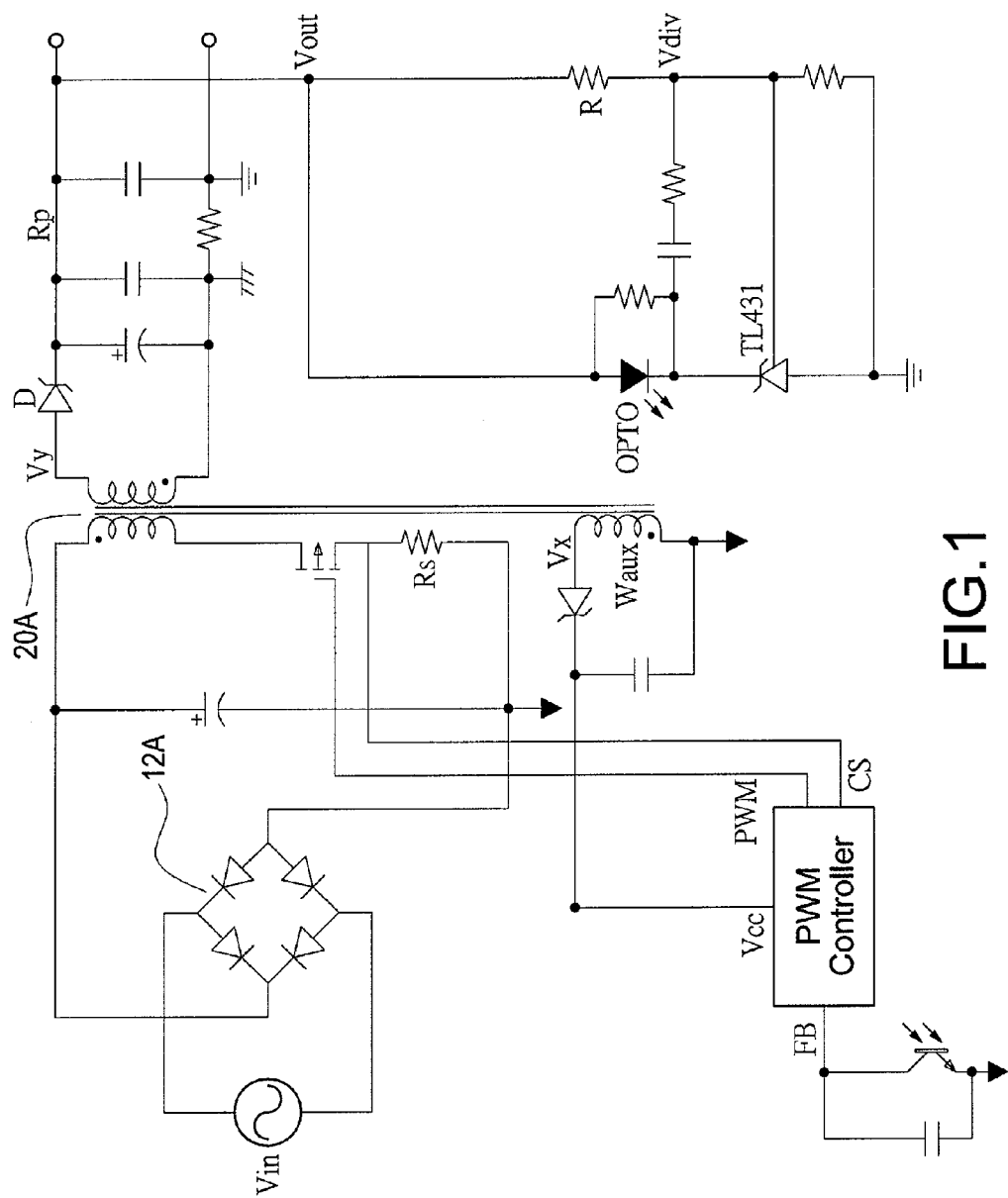
FIG. 1 shows a block diagram for a prior art flyback converter.
Figure 2:
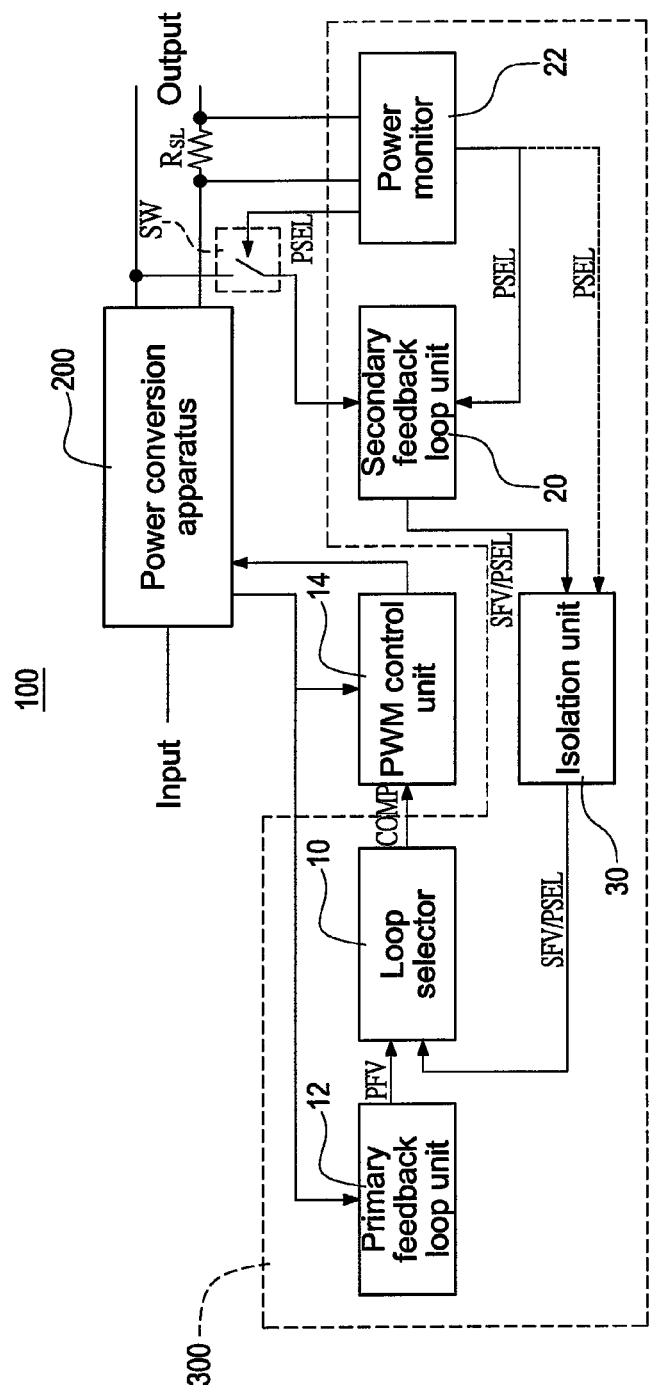
FIG. 2 shows a block diagram of the flyback converter system according to a preferred embodiment of the present invention.

FIG. 2 shows a block diagram of the flyback converter system according to a preferred embodiment of the present invention. The flyback converter system 100 according to the present invention mainly comprises a power conversion apparatus 200 and a feedback control apparatus 300. The power conversion apparatus 200 receives an AC input voltage and converts it into a DC output voltage for outputting the DC output voltage through an output port. The power conversion apparatus 200 comprises, for example, the full-bridge rectifying unit 12A and the transformer 20A shown in FIG. 1. However, those elements are known to those skilled in the art and the detail descriptions are omitted here for brevity.

The flyback converter system 100 further comprises, at the primary side, a loop selector 10, a primary feedback loop unit 12 and a pulse width modulation (PWM) control unit 14. The flyback converter system 100 further comprises, at the secondary side, a secondary feedback loop unit 20 and a power monitor 22, and further comprises an isolation unit 30 operationally connected between the primary side and the secondary side of the flyback converter system 100. According to a preferred embodiment of the present invention, the power monitor 22 can sense electric voltage or electric current at an output port of the flyback converter system 100 to monitor the output power of the flyback converter system 100. For the sake of a clear description, the power monitor 22 can be exemplified to include a current sensor. However, this example is used only for demonstration and not for limitation of the scope of the subject application.

As shown in FIG. 2, the feedback control apparatus 300 of the flyback converter system 100 comprises the loop selector 10, the primary feedback loop unit 12, the secondary feedback loop unit 20, the power monitor 22 and the isolation unit 30. The feedback control apparatus 300 selectively sends the feedback signal of the primary feedback loop unit 12 or the feedback signal of the secondary feedback loop unit 20 to the PWM control unit 14, thus regulating the output power of the flyback converter system 100.

The secondary feedback loop unit 20 is configured to sense an output voltage on the output port of the flyback converter system 100 to generate a secondary feedback voltage signal SFV. The power monitor 22 senses a load current of the output port of the flyback converter system 100, and compares the load current with a reference current to generate a feedback selection signal PSEL. Alternatively, the power monitor 22 senses a current flowing through a resistor Rsl shown in FIG. 2, and compares the sensed current with a reference current to generate a feedback selection signal PSEL. The secondary feedback loop unit 20 receives the feedback selection signal PSEL and sends the feedback selection signal PSEL and the secondary feedback voltage signal SFV thereof to the isolation unit 30. The isolation unit 30 comprises at least one isolation transformer such as optical coupler as well as the necessary driver circuit to operate the optical coupler. For the sake of clear description, the isolation transformer will be exemplified as an optical coupler. According to a preferred embodiment of the present invention, the secondary feedback loop unit 20 combines the received feedback selection signal PSEL and the secondary feedback voltage signal SFV thereof into a composite signal. In this case, the isolation unit 30 needs only one optical coupler, and the composite signal is sent through the optical coupler. Alternatively, the secondary feedback loop unit 20 can send the received feedback selection signal PSEL and the secondary feedback voltage signal SFV in a multiplex connection (such as time division multiplex), and the isolation unit 30 needs only one optical coupler. Moreover, when the secondary feedback loop unit 20 sends the received feedback selection signal PSEL and the secondary feedback voltage signal SFV separately, the isolation unit 30 may comprise two optical couplers or, in general, two isolation transformers to send those signals respectively.

The primary feedback loop unit 12 is electrically connected to the auxiliary winding to sense an electric power at primary side of the flyback converter system 100, and generates a primary feedback voltage signal PFV according to the sensed output error voltage from the primary side. The primary feedback loop unit 12 sends the primary feedback voltage signal PFV to the loop selector 10. The isolation unit 30 sends the feedback selection signal PSEL and the secondary feedback voltage signal SFV, sent from the secondary feedback loop unit 20, to the loop selector 10. Depending on the value of PSEL, the loop selector 10 sends one of the primary feedback voltage signal PFV or the secondary feedback voltage signal SFV as a feedback input signal COMP to the PWM control unit 14.

During regular-load operation, namely in full-load or normal-load operating conditions, the load current is larger than the reference current. In this condition, the power monitor 22 generates the feedback selection signal PSEL such that the loop selector 10 selects the secondary feedback voltage signal SFV as the feedback input signal COMP to the PWM control unit 14. In one embodiment, the feedback selection signal PSEL is a digital signal and the default logic value is logic 0. In this default setting, the feedback signal COMP connects to the secondary feedback voltage signal SFV sent from the secondary feedback loop unit 20. PSEL remains at 0 during full-load or normal-load operating conditions. In this situation, the loop selector 10 continues to select the secondary feedback voltage signal SFV as the feedback input signal COMP for the PWM control unit 14, and the PWM control unit 14 further controls a switching unit according to the feedback input signal COMP.

During light-load conditions, the load current is smaller than the reference current. The light-load condition can be set by the user. Typically a light-load condition is met when the load current is less than 10% to 20% of the current during full-load conditions. When the power monitor 22 detects the light-load condition, it sets the feedback selection signal PSEL to logic 1 such that the loop selector 10 selects the primary feedback voltage signal PFV as the feedback input signal COMP to the PWM control unit 14. The PWM control unit 14 further controls a switching unit according to the feedback input signal COMP.

When the power monitor 22 judges that the flyback converter system 100 is operating in a light-load condition, the power monitor 22 sends a control signal to the secondary feedback loop unit 20 to cut off the electrical power supplied to the secondary feedback loop unit 20. Because the flyback converter system 100 uses the primary feedback voltage signal PFV as the feedback signal during light-load conditions, cutting off the electrical power supplied to the secondary feedback loop unit 20 does not affect the operation while it saves the power consumption of the flyback converter system 100. For example, as shown in FIG. 2, the logic levels for the feedback selection signal PSEL are different for full-load or light-load conditions. Therefore, the feedback selection signal PSEL can be used to operate a switch SW connected between the output port of the flyback converter system 100 and the secondary feedback loop unit 20. The feedback selection signal PSEL turns off the switch SW in light-load conditions to cut off the electric power delivered to the secondary feedback loop unit 20 to save power.

In this situation, the power monitor 22 sends the feedback selection signal PSEL through another light emitter (not shown) to the loop selector 10, and the signal is transmitted along the dashed path in FIG. 2. Moreover, the secondary feedback loop unit 20 is generally implemented with a voltage regulator, and the voltage regulator consumes power of several milliwatts in light-load states of the conventional flyback converter system 100. According to another preferred embodiment, the voltage regulator is turned off (namely, the power delivered to the voltage regulator is cut off) in light-load conditions. In this situation, the regulation of the flyback converter system 100 relies on the primary feedback voltage signal PFV to save power. In other word, the flyback converter system 100 shown in FIG. 2 has a precise and quick feedback control provided by the secondary feedback loop unit 20 in regular-load conditions, and has feedback control provided by the primary feedback loop unit 12 with less power consumption (because the secondary feedback loop unit 20 is disabled) in light-load conditions. In light-load conditions, the regulation requirement is typically not as strict as it is in regular-load conditions. In addition, the lower output current reduces the errors inherently existing in the primary side sensing circuit. The feedback control provided by the primary feedback loop unit 12 is sufficient for the flyback converter system 100. Moreover, majority of electronic devices stay in the light-load conditions most of the time. The disabling of the secondary feedback loop unit 20 in light-load conditions saves a substantial amount of power.

Figure 3:
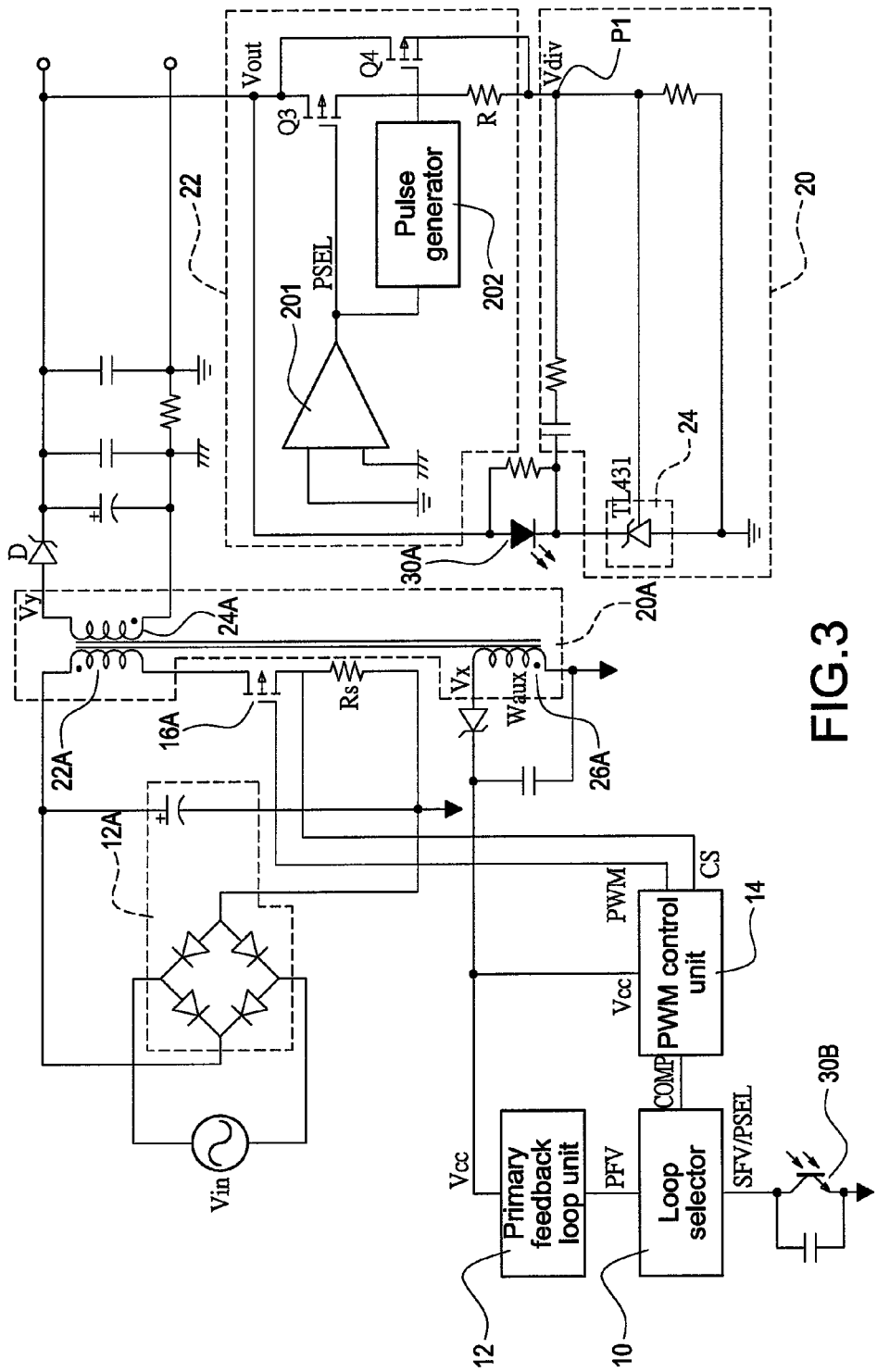
FIG. 3 shows a circuit diagram for the flyback converter system according to a preferred embodiment of the present invention.

FIG. 3 shows a circuit diagram for the flyback converter system 100 according to a preferred embodiment of the present invention. It should be noted that the circuit shown in FIG. 3 only demonstrates one possible implementation of the flyback converter system 100 according to the present invention, and the circuit shown in FIG. 3 is not for limitation of the scope of the present invention. Parts of elements in FIG. 3 are the same or similar to those in FIG. 1, therefore, they use the same numerals and the detailed descriptions are omitted here for brevity. The elements include the full-bridge rectifying unit 12A, the switching unit 16A, and the transformer 20A, where the transformer 20A further includes the primary winding 22A, the second winding 24A and the auxiliary winding 26A.

In the circuit shown in FIG. 3, an induction voltage Vx is generated on the auxiliary winding 26A and the induction voltage Vx is applied to an anode end of a diode to produce a forward voltage Vcc, where the forward voltage Vcc is supplied to the primary feedback loop unit 12. Vcc serves as the power supply voltage for PWM control unit 14. Vcc can also be used to extract the induction voltage Vx by adding the forward biased diode voltage. By comparing Vcc with an internal reference voltage, an error signal can be generated and become the primary feedback voltage signal PFV. Alternatively, a commercially available primary side flyback regulator (such as Linear Technology LT3573) can be directly connected to the induction voltage Vx of the auxiliary winding 26A to provide the primary feedback voltage signal PFV. The PWM control unit 14 receives the feedback input signal COMP (which can be either the primary feedback voltage signal PFV in light-load conditions or the secondary feedback voltage signal SFV in full-load conditions) of the loop selector 10, and then outputs a switch control signal PWM to the switching unit 16A for feedback control. In this shown embodiment, the isolation unit 30 is implemented by an optical coupler and comprises a light emitter 30A and a photo transistor 30B.

As shown in this figure, the power monitor 22 includes a first transistor switch Q3 and a second transistor switch Q4, a voltage division resistor R, a current sensor 201 and a pulse generator 202. More particularly, the transistor switch can be implemented, for example, by an MOS transistor or a BJT, and the first transistor switch Q3 and the second transistor switch Q4 are exemplified as the first MOS switch Q3 and the second MOS switch Q4 in the following description. However, the scope of the present invention is not limited to this example. The gate of the first MOS switch Q3 is electrically connected to the feedback selection signal PSEL output by the current sensor 22, the source/drain of the first MOS switch Q3 is electrically connected between the output voltage Vout and the division voltage Vdiv at node P1 (through the voltage division resistor R). In full-load or normal load conditions, the current sensor 201 senses the load current and generates a corresponding feedback selection signal PSEL to turn on the first MOS switch Q3. At this time, the output voltage Vout is connected to the node P1 through the voltage division resistor R. As shown in this figure, the voltage regulator 24 (namely the shown element TL431) is activated and the isolation unit 30 sends the feedback selection signal PSEL and the secondary feedback voltage signal SFV. More particularly, in full-load conditions, the output voltage Vout is connected to the node P1 through the voltage division resistor R such that the division voltage Vdiv at node P1 can be used for the generation of the secondary feedback voltage signal SFV.

Moreover, in light-load conditions, the current sensor 201 senses the load current and generates a corresponding feedback selection signal PSEL to turn off the first MOS switch Q3. At this time, the output voltage Vout is not connected to the node P1 through the voltage division resistor R and the division voltage Vdiv at node P1 is not sufficient for the voltage regulator 24 to work. Therefore, the secondary feedback loop unit 20 is disabled and the secondary feedback voltage signal SFV is not generated. When the operation of the flyback converter system 100 is changed from the full-load condition to the light-load condition, the feedback selection signal PSEL output by the current sensor 201 also has a change. This triggers the pulse generator 202 to generate a pulse train. The pulse train is superimposed on the feedback selection signal PSEL, and the superimposed feedback selection signal PSEL is sent by the light emitter 30A to inform the loop selector 10 of the load condition change. The incorporation of a pulse train in a feedback selection signal PSEL can facilitate the judgment of the loop selector 10 when the isolation unit 30 shown in FIG. 2 is implemented by a photo coupler. When the load condition is changed from full-load to light-load, the secondary feedback loop unit 20 sends the superimposed feedback selection signal PSEL to the loop selector 10. The loop selector 10 then selects the primary feedback voltage signal PFV as the feedback input signal COMP. It should be noted that the example shown in FIG. 3 is only for demonstration and the flyback converter system 100 can be implemented in other ways.

Figure 4:
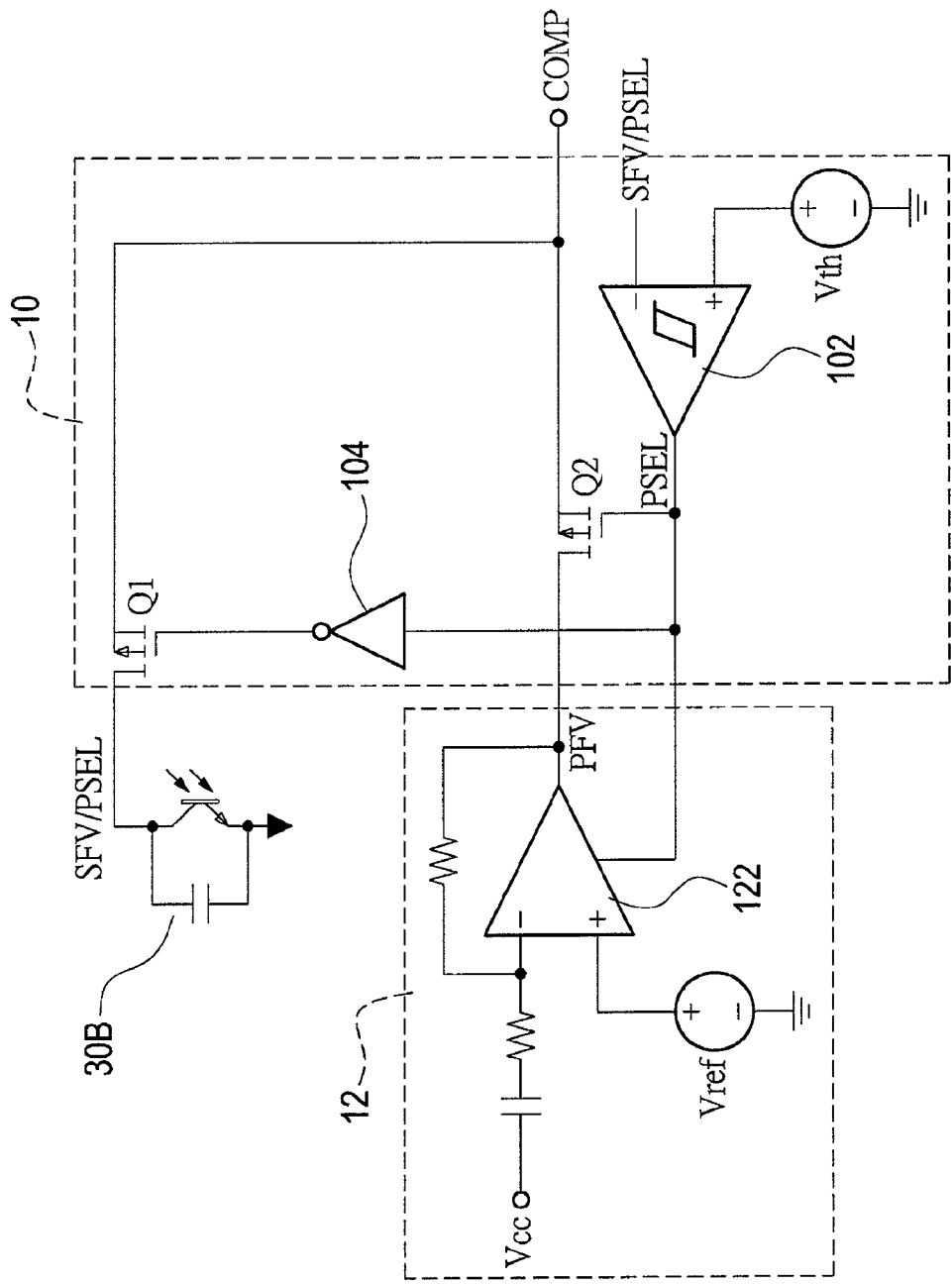
FIG. 4 shows the circuit diagram of the loop selector and the primary feedback loop unit according to a preferred embodiment of the present invention.

FIG. 4 shows the circuit diagram of the loop selector 10 and the primary feedback loop unit 12 according to a preferred embodiment of the present invention. The primary feedback loop unit 12 comprises an operational amplifier 122, which receives the forward voltage Vcc and compares it with a primary reference voltage Vref to generate the primary feedback voltage signal PFV. The loop selector 10 comprises a hysteresis comparator 102, a secondary side transistor switch (such as a MOS switch or a BJT switch) Q1, a primary side transistor switch (such as a MOS switch or a BJT switch) Q2, and an inverter 104. The positive input of the hysteresis comparator 102 receives the feedback selection signal PSEL and the secondary feedback voltage signal SFV, and the negative input of the hysteresis comparator 102 receives a threshold voltage Vth, whereby the hysteresis comparator 102 can remove the secondary feedback voltage signal SFV and output the feedback selection signal PSEL only. The feedback selection signal PSEL directly controls the switch Q2 and indirectly controls (through the inverter 104) the switch Q1, thus selectively sending the secondary feedback voltage signal SFV or the primary feedback voltage signal PFV as the feedback input signal COMP. The feedback input signal COMP is sent to the PWM control unit 14 for feedback control.

Figure 5:
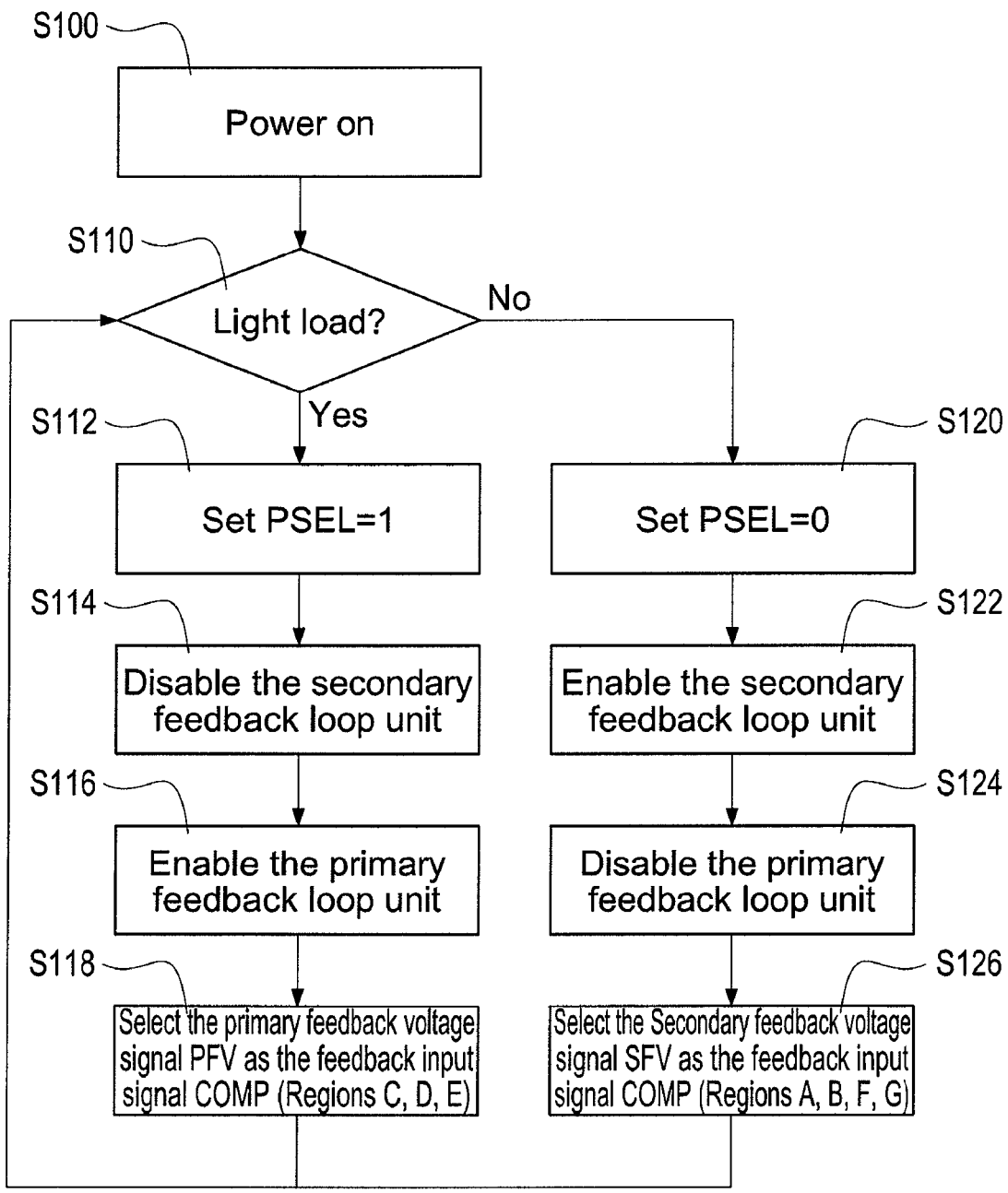
FIG. 5 shows a flowchart of the feedback controlling method for a flyback converter system.
Figure 6:
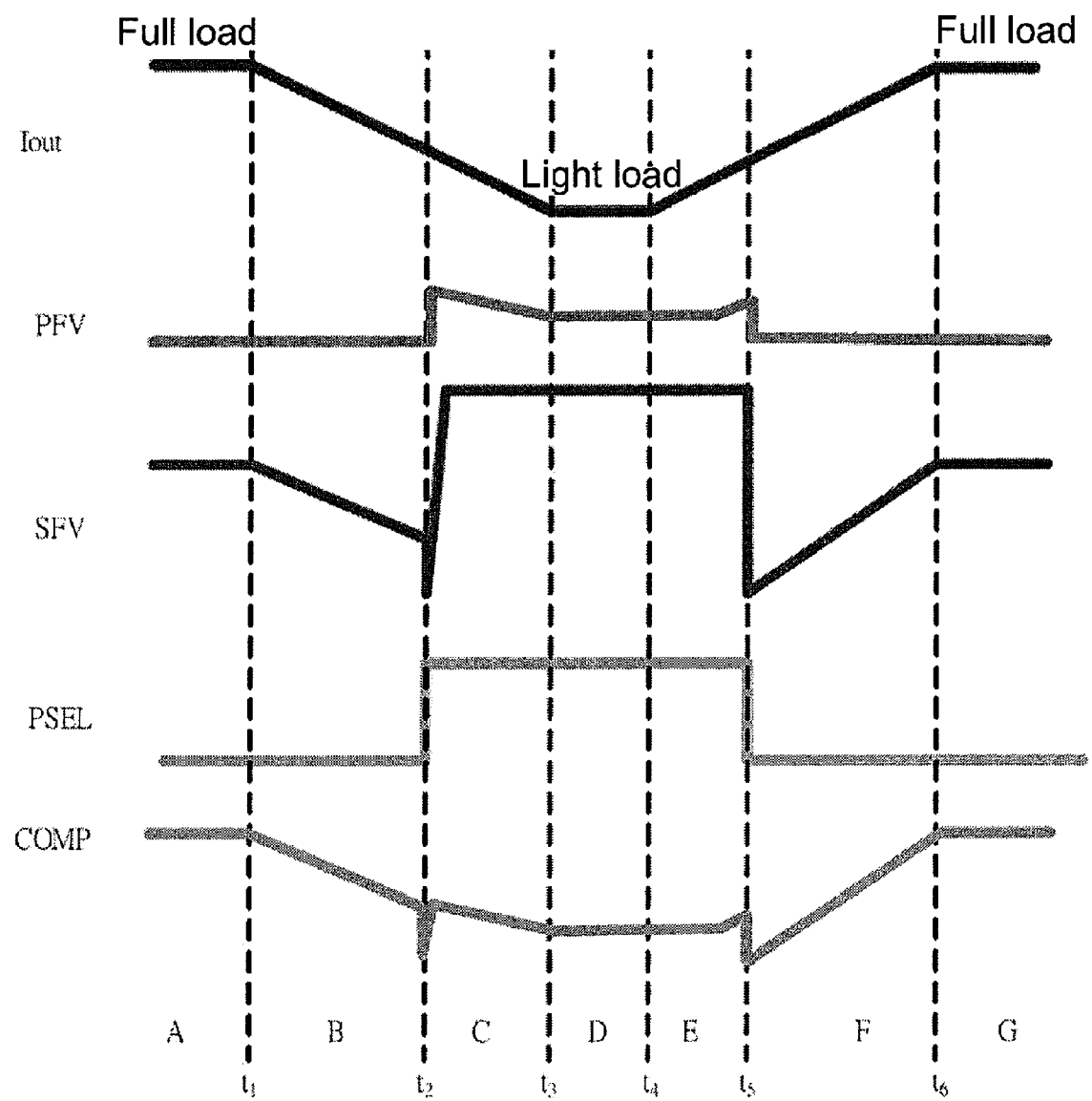
FIG. 6 shows the waveforms of some signals involved in the steps performed in the flowchart of FIG. 5.

FIG. 5 shows a flowchart of the feedback controlling method for a flyback converter system. FIG. 6 shows the waveforms of some signals involved in the steps performed in the flowchart of FIG. 5. With reference also to FIG. 2, after the flyback converter system 100 is powered on (step S100), the power monitor 22 judges whether the flyback converter system 100 is operated in a light-load condition by measuring a load current Iout (step S110). If the flyback converter system 100 is operating in a light-load condition, the power monitor 22 outputs the feedback selection signal PSEL corresponding to the light-load condition, namely, PSEL=1, to select the primary feedback voltage signal PFV for feedback control (step S112). The moment when the power monitor 22 outputs the feedback selection signal PSEL corresponding to the light-load condition, is shown at the time point t2 in FIG. 6. Afterward, the power monitor 22 sends a control signal to the secondary feedback loop unit 20 to disable the secondary feedback loop unit 20 (step S114). The disabling of the secondary feedback loop unit 20 can be realized by cutting off power delivered to the secondary feedback loop unit 20 (for example, cutting the connection between the secondary feedback loop unit 20 and the output port of the flyback converter system 100) to save electric energy. Another way to disable the secondary feedback loop unit 20 is to turn off the first transistor switch Q3 in FIG. 3 to cut off the connection between the output voltage Vout and the node P1. The voltage regulator 24 does not work and considerable electrical energy can be saved. Also at the time point t2, the loop selector 10 enables the primary feedback loop unit 12, namely, selects the primary feedback voltage signal PFV as the feedback input signal COMP (step S116) and the primary feedback voltage signal PFV is sent as the feedback input signal COMP to control the PWM control unit 14 (step S118). As can be seen in FIG. 6, the regions marked with letter C, D, E correspond to the light-load condition and the feedback input signal COMP substantially follows the primary feedback voltage signal PFV.

If the power monitor 22 judges that the flyback converter system 100 is not operating in a light-load condition (step S110), the power monitor 22 outputs the feedback selection signal PSEL corresponding to the full-load condition, namely, PSEL=0 (step S120). This moment corresponds to time point t5 shown in FIG. 6. The power monitor 22 then sends a control signal to the secondary feedback loop unit 20 to enable the secondary feedback loop unit 20 (step S122). In other word, the secondary feedback loop unit 20 regains power or the transistor switch Q3 in the secondary feedback loop unit 20 is turned on to enable the secondary feedback loop unit 20. At the same time, the loop selector 10 disables the primary feedback loop unit 12 (step S124). Namely, the loop selector 10 selects the secondary feedback voltage signal SFV instead of the primary feedback voltage signal PFV as the feedback input signal COMP (step S126). As can be seen in FIG. 6, the regions marked with letter A, B, F, G correspond to the full-load condition and the feedback input signal COMP substantially follows the secondary feedback voltage signal SFV.

Moreover, according to another embodiment of the present invention, the loop selector 10 selects the lesser one (with smaller value) of the primary feedback voltage signal PFV and the secondary feedback voltage signal SFV as the feedback input signal COMP at time points t2 and t5. This can prevent any ambiguity when the secondary feedback loop unit 20 is disabled and the primary feedback loop unit 12 is not enabled, and vice versa.

To sum up, the flyback converter system according to the present invention has the following advantages:

1. The primary feedback signal and the secondary feedback signal are selected according to the load condition. The flyback converter system has accurate output regulation and fast dynamic response during normal-load (full-load) condition, and has less power consumption during light-load or no-load condition.

2. The feedback selection signal PSEL is superimposed with a pulse train at the onset of the light-load condition, thus facilitating the judgment of the loop selector at the primary side.

3. The flyback converter system has both a primary side feedback and a secondary side feedback and thus can be used for high power application (more than 15 W). The standby power consumption of the flyback converter system in high power application can also be reduced.

As the skilled person will appreciate, various changes and modifications can be made to the described embodiments. It is intended to include all such variations, modifications and equivalents which fall within the scope of the invention, as defined in the accompanying claims.

What is claimed is:
1. A flyback converter system, comprising:
a transformer unit comprising a primary winding, a secondary winding and an auxiliary winding, which are magnetically coupled to each other;
a switch unit electrically connected to the primary winding;
a pulse width modulation (PWM) control unit electrically connected to the switch unit;
a primary feedback loop unit electrically connected to the auxiliary winding and generating a primary feedback voltage signal according to an induced voltage of the auxiliary winding;
a secondary feedback loop unit electrically connected to the secondary winding and generating a secondary feedback voltage signal according to an output voltage of the secondary winding;
a loop selector operatively connected to the primary feedback loop unit and the secondary feedback loop unit, and electrically connected to the PWM control unit; and a power monitor electrically connected to the secondary winding and electrically isolated with the loop selector, the power monitor configured to generate a feedback selection signal according to a power level output by the flyback converter system;

wherein the feedback selection signal turns off a switch connected between the secondary feedback loop and an output port of the flyback converter system to cut electric power supplied to the secondary feedback loop in light-load condition;

wherein the loop selector is controlled by the feedback selection signal to select the primary feedback voltage signal as a feedback input signal in light-load condition and to select the secondary feedback voltage signal as the feedback input signal in full-load condition;

wherein the primary winding and the auxiliary winding are located at a primary side, and the secondary winding is located at a secondary side.

2. The flyback converter system in claim 1, wherein the power monitor is electrically connected to the secondary winding and senses an output power of the secondary winding.

3. The flyback converter system in claim 1, further comprising an isolation unit operatively connected between the secondary feedback loop unit and the loop selector for providing electrical isolation therebetween.

4. The flyback converter system in claim 1, wherein the power monitor is configured to cut off an electrical connection between the secondary feedback loop unit and the secondary winding to disable the secondary feedback loop unit.

5. The flyback converter system in claim 1, wherein the secondary feedback loop unit comprises a voltage regulator, and the power monitor is configured to power off the voltage regulator to disable the secondary feedback loop unit.

6. The flyback converter system in claim 1, wherein the secondary feedback loop unit further comprises a pulse generator electrically connected to an output of the power monitor, and the pulse generator generating a pulse train in light-load condition.

7. A feedback control apparatus for a flyback converter system, the flyback converter system comprising a transformer unit, a switch unit and a pulse width modulation (PWM) control unit, the feedback control apparatus comprising:
  a primary feedback loop unit electrically connected to an auxiliary winding of the transformer unit and generating a primary feedback voltage signal according to an induced voltage of the auxiliary winding;
  a secondary feedback loop unit electrically connected to a secondary winding of the transformer unit and generating a secondary feedback voltage signal according to an output voltage of the secondary winding;
  a loop selector operatively connected to the primary feedback loop unit and the secondary feedback loop unit, and electrically connected to the PWM control unit; and
  a power monitor electrically connected to the secondary winding and electrically isolated with the loop selector, the power monitor configured to generate a feedback selection signal according to a power level output by the flyback converter system;
  wherein the feedback selection signal turns off a switch connected between the secondary feedback loop and an output port of the flyback converter system to cut electric power supplied to the secondary feedback loop in light-load condition;
  wherein the loop selector is controlled by the feedback selection signal to select the primary feedback voltage signal as a feedback input signal in light-load condition and to select the secondary feedback voltage signal as the feedback input signal in full-load condition;
  wherein a primary winding and the auxiliary winding are located at a primary side, and the secondary winding is located at a secondary side.

8. The feedback control apparatus in claim 7, wherein the power monitor is electrically connected to the secondary winding and senses an output power of the secondary winding.

9. The feedback control apparatus in claim 7, further comprising an isolation unit operatively connected between the secondary feedback loop unit and the loop selector for providing electrical isolation therebetween.

10. The feedback control apparatus in claim 7, wherein the power monitor is configured to cut off an electrical connection between the secondary feedback loop unit and the secondary winding to disable the secondary feedback loop unit.

11. The feedback control apparatus in claim 7, wherein the secondary feedback loop unit comprises a voltage regulator, and the power monitor is configured to power off the voltage regulator to disable the secondary feedback loop unit.

12. The feedback control apparatus in claim 7, wherein the secondary feedback loop unit further comprises a pulse generator electrically connected to an output of the power monitor, and the pulse generator generating a pulse train in light-load conditions.

13. A feedback control method for a flyback converter system, the flyback converter system comprising a transformer unit, a switch unit and a pulse width modulation (PWM) control unit, the method comprising:
  (a) providing a primary feedback loop unit electrically connected to an auxiliary winding of the transformer unit and generating a primary feedback voltage signal according to an induced voltage of the auxiliary winding;
  (b) providing a secondary feedback loop unit electrically connected to a secondary winding of the transformer unit and generating a secondary feedback voltage signal according to an output voltage of the secondary winding;
  (c) judging whether the flyback converter system is operating in light-load conditions or in full load condition;
  (d) using the primary feedback voltage signal as feedback control signal when the flyback converter system is operated in light-load conditions and using the secondary feedback voltage signal as feedback control signal when the flyback converter system is operated in full-load conditions; and
  (d1) using a switch at secondary side to cut a connection between the secondary feedback loop unit and an output port of the flyback converter system to cut electric power supplied to the secondary feedback loop when the flyback converter system is operated in light-load conditions;
  wherein a primary winding and the auxiliary winding are located at a primary side, and the secondary winding is located at a secondary side.

14. The method in claim 13, further comprising the following steps when the flyback converter system is not operated in light-load conditions in step (c):
  (e1) enabling the secondary feedback loop unit and using the secondary feedback voltage signal as the feedback control signal; and
  (e2) disabling the primary feedback loop unit.

15. The method in claim 13, wherein the secondary feedback loop unit comprises a voltage regulator and the voltage regulator is turned off in step (d1).

16. The method in claim 13, wherein the electric power of the secondary feedback loop unit is cut off in step (d1).

* * * * *